United States Patent [19]

Naito

[11] Patent Number: 5,877,879
[45] Date of Patent: *Mar. 2, 1999

[54] WAVELENGTH DIVISION MULTIPLEXING OPTICAL TRANSMISSION SYSTEM AND OPTICAL TRANSMITTING DEVICE USED IN THE TRANSMISSION SYSTEM

[75] Inventor: Takao Naito, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 627,754

[22] Filed: Mar. 29, 1996

[30] Foreign Application Priority Data

Aug. 1, 1995 [JP] Japan .................................... 7-196258

[51] Int. Cl.⁶ .................................................. H04J 14/02
[52] U.S. Cl. ............................ 359/133; 359/161; 359/181
[58] Field of Search ............................ 359/124, 133–134, 359/160–161, 181–182

[56] References Cited

U.S. PATENT DOCUMENTS

| | | | |
|---|---|---|---|
| 4,945,531 | 7/1990 | Suzuki | 359/133 |
| 5,224,183 | 6/1993 | Dugan | 359/161 |
| 5,361,319 | 11/1994 | Antos et al. | 385/123 |
| 5,587,830 | 12/1996 | Chraplyvy et al. | 359/161 |
| 5,589,969 | 12/1996 | Taga et al. | 359/133 |
| 5,606,455 | 2/1997 | Kikuchi et al. | 359/161 |

FOREIGN PATENT DOCUMENTS

| | | |
|---|---|---|
| 0 256 808 | 2/1988 | European Pat. Off. . |
| 0 256 810 | 2/1988 | European Pat. Off. . |
| 0 257 889 | 3/1988 | European Pat. Off. . |
| 0297504 | 1/1989 | European Pat. Off. . |
| 0 493 816 | 7/1992 | European Pat. Off. . |
| 0 493 817 | 7/1992 | European Pat. Off. . |
| 0590633 | 4/1994 | European Pat. Off. ............... 359/161 |
| 0633672 | 1/1995 | European Pat. Off. . |
| 0658015 | 6/1995 | European Pat. Off. . |
| 0720312 | 7/1996 | European Pat. Off. . |
| 5110517 | 4/1993 | Japan . |
| 2237468 | 5/1991 | United Kingdom . |
| 2237469 | 5/1991 | United Kingdom . |
| 94/130 76 | 6/1994 | WIPO . |

OTHER PUBLICATIONS

N.S. Bergano et al., "Polarization–scrambling–induced tuning jitter in optional—amplifier systems", OFC '95 Technical Bigest, pp. 122–123.

*Primary Examiner*—Kinfe-Michael Negash
*Attorney, Agent, or Firm*—Helfgott & Karas, P.C.

[57] ABSTRACT

An optical transmitting device suitable for use in a wavelength division multiplexing optical transmission system for transmitting a plurality of optical signals different in wavelength through a transmission line. The optical transmitting device includes a plurality of electro-optical converters for respectively converting electrical signals into a plurality of optical signals different in wavelength, a plurality of precompensators for chromatic dispersion respectively connected to the plural electro-optical converters, for respectively giving certain chromatic dispersions to the plural optical signals, and an optical multiplexer connected to the plural pre-compensators for chromatic dispersion, for multiplexing the plural optical signals to which the certain chromatic dispersions have been given. Each precompensator for chromatic dispersion compensates for a chromatic dispersion difference in the transmission line due to a wavelength difference between a wavelength of each optical signal and a specific wavelength at which a chromatic dispersion in the transmission line becomes zero.

16 Claims, 18 Drawing Sheets

F I G. 5
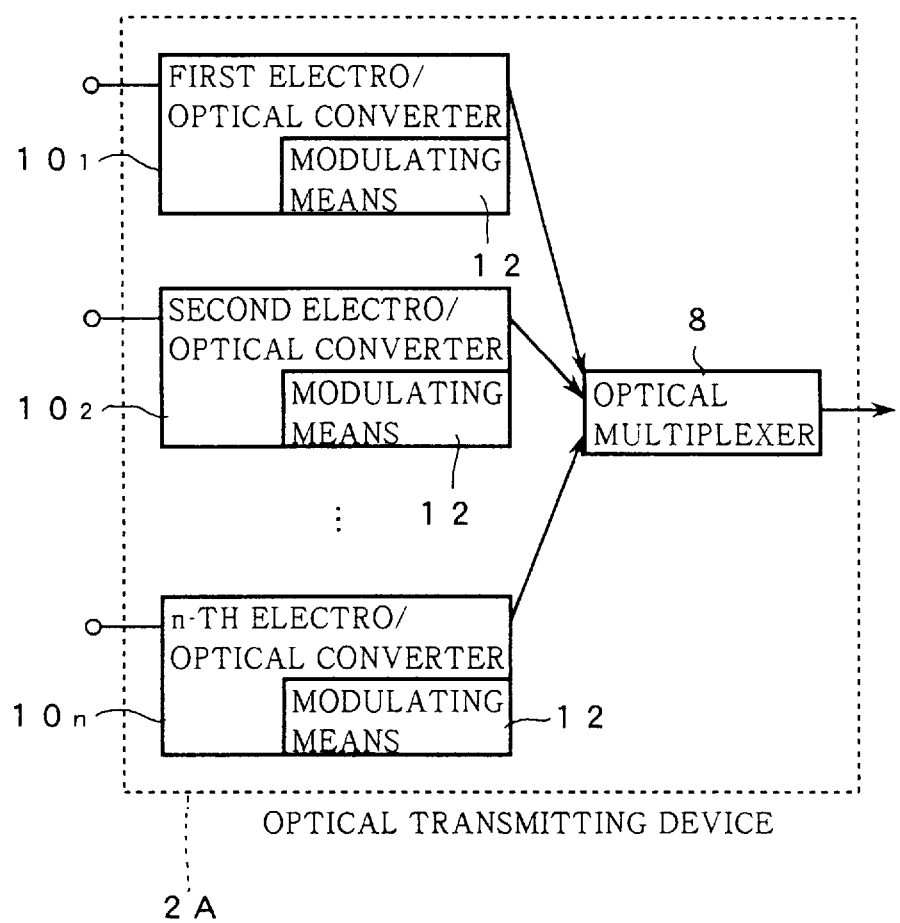

F I G. 7A
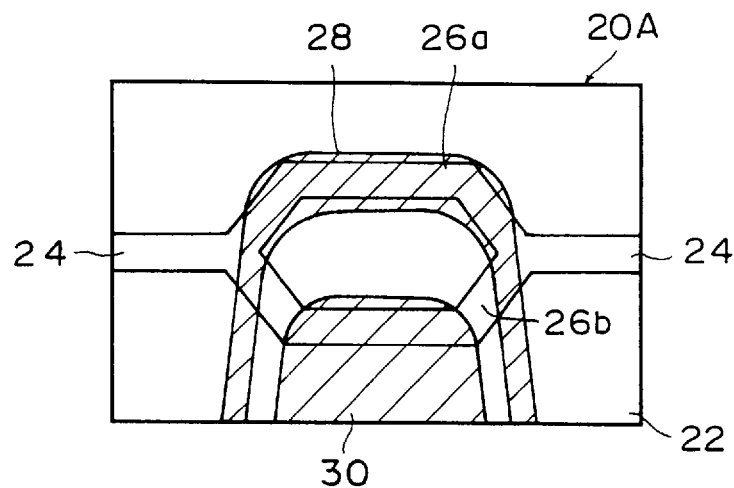
F I G. 7B
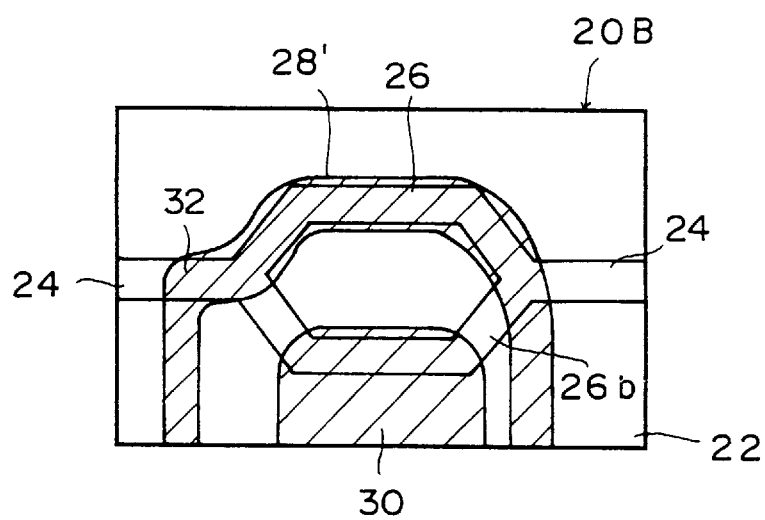

WAVELENGTH DIVISION MULTIPLEXING OPTICAL TRANSMISSION SYSTEM AND OPTICAL TRANSMITTING DEVICE USED IN THE TRANSMISSION SYSTEM

BACKGROUND OF THE INVENTION

1. Field of the Invention

The present invention relates generally to a wavelength division multiplexing optical transmission system, and more particularly to an optical transmitting device suitable for use in this transmission system.

2. Description of the Related Art

In a conventional long-distance optical transmission system traversing the ocean over a distance of thousands of kilometers, a plurality of regenerative repeaters for converting an optical signal into an electrical signal and performing retiming, reshaping, and regenerating are used to transmit the optical signal. At present, however, an optical amplifier has been progressively put into practical use, and an optical amplification repeating transmission system using the optical amplifier as a linear repeater is examined. The replacement of the regenerative repeater by the optical amplification repeater allows a great reduction in number of parts in the repeater, ensuring of reliability, and expectation of a great reduction in cost.

Further, as one of methods for realizing a large capacity of an optical transmission system, attention is focused on a wavelength division multiplexing (WDM) optical transmission system for multiplexing a plurality of optical signals different in wavelength in one optical transmission line and transmitting the multiplexed optical signals in the optical transmission line. In a WDM optical amplification repeating transmission system configured by combining the WDM optical transmission system and the optical amplification repeating transmission system, it is possible to collectively amplify a plurality of optical signals different in wavelength by using optical amplifiers, so that large-capacity and long-distance transmission of optical signals can be realized with a simple configuration.

As a conventional wavelength division multiplexing optical transmission system, there has been proposed a report on an optical amplification repeating transmission test employing eight channels, a transmission speed per channel of 5 Gb/s (total capacity of 40 Gb/s), and a transmission distance of 8000 km (circular length of 1000 km) (OFC'95, PD19, N. S. Bergano et al. AT&T). In the above report, the wavelengths of the eight optical signals are set at regular intervals of 0.53 nm in the range of 1556.0 nm to 1559.7 nm, and channel numbers are allocated to these different wavelengths from the shorter wavelength side. A 1.5 $\mu$m zero-dispersion fiber (dispersion-shifted fiber, DSF) and a 1.3 $\mu$m zero-dispersion fiber (high-dispersion fiber, HDF) are used as a transmission line.

The dispersion in the dispersion-shifted fiber is $-2$ ps/nm/km in average at a wavelength of 1558 nm. The dispersion in the high-dispersion fiber can be estimated to about 20 ps/nm/km. A circular loop is constructed of an optical transmission line and twenty-two optical amplification repeaters and one signal light level compensating optical amplifier inserted in the optical transmission line. The repeater spacing is 45 km. The dispersion-shifted fiber is used in the first repeating section to the twentieth repeating section, and the high-dispersion fiber is used in the twenty-first and twenty-second repeating sections. After circulating the circular loop eight times, each optical signal is subjected to dispersion compensation (post-compensation) by using a dispersion compensating fiber (DEF) on the receiving side. The length of the dispersion compensating fiber for each channel (signal light wavelength) is adjusted in performing the dispersion compensation.

In the above report, a bit error rate of $2\times10^{-10}$ is reached, and there is almost no system margin. To enlarge a system margin, a method of increasing the output light power of the optical amplification repeater may be considered. In this case, however, since this method is largely affected by a non-linear effect of the transmission line, it is important to design the chromatic dispersion in the transmission line in sufficient consideration of the non-linear effect. FIG. 18 shows a chromatic dispersion map in the case where the signal light wavelength is 1558.0 nm. As apparent from FIG. 18, a chromatic dispersion of $-1800$ ps/nm occurs upon 900 km transmission, and this chromatic dispersion can be subsequently compensated up to almost 0 ps/nm by using the high-dispersion fiber having a total length of 90 km. Thereafter, this pattern is repeated.

FIG. 19 shows a chromatic dispersion map of the signal light having a wavelength of 1556.0 nm as the first channel. As apparent from FIG. 19, a chromatic dispersion of $-1960$ ps/nm occurs upon 900 km transmission, but a chromatic dispersion of about $-160$ ps/nm remains even after performing the dispersion compensation by the use of the high-dispersion fiber having a total length of 90 km. Accordingly, the final chromatic dispersion upon 8000 km transmission reaches $-1280$ ps/nm. FIG. 20 shows a chromatic dispersion map of the signal light having a wavelength of 1559.7 nm as the eighth channel. As apparent from FIG. 20, the final chromatic dispersion upon 8000 km transmission reaches $+1100$ ps/nm.

Accordingly, the difference between the remaining chromatic dispersion of the first channel and the remaining chromatic dispersion of the eighth channel becomes 2000 ps/nm or more. In the case where the output light power of the optical amplification repeater is small enough, an allowable chromatic dispersion quantity can be obtained in no consideration of the non-linear effect, and there is almost no problem because the allowable chromatic dispersion quantity is relatively large. However, in the case where the output light power of the optical amplification repeater is large, the allowable chromatic dispersion quantity is affected by the non-linear effect to become small. Therefore, there is a limit in the chromatic dispersion compensation (post-compensation) on the receiving side as described in the above report.

FIG. 21 shows the wavelength dependence of transmission characteristics in the case where only the post-compensation for chromatic dispersion is performed. In FIG. 21, a minimum eye aperture deterioration obtained by optimizing a post-compensation quantity is shown. As apparent from FIG. 21, a large eye aperture deterioration occurs in wavelength regions shorter and longer than a reference wavelength of 1558 nm. However, the output of the optical amplifier is assumed as +4 dBm.

In a long-distance wavelength division multiplexing optical amplification repeating transmission system, a chromatic dispersion quantity in each channel is largely slipped during transmission by the influence of chromatic dispersion slope (secondary dispersion) even when the chromatic dispersion in the transmission line is divisionally compensated, because of different signal light wavelengths in all channels. While the above report shows that the chromatic dispersion compensation (post-compensation) is performed by giving an optimal chromatic dispersion quantity to each channel on the receiving side, there is a limit in the extent of improvement as mentioned above.

SUMMARY OF THE INVENTION

It is therefore an object of the present invention to provide a wavelength division multiplexing optical transmission system which can suppress the waveform distortion of signal light by performing improved chromatic dispersion compensation.

It is another object of the present invention to provide an optical transmitting device which can suppress the waveform distortion of signal light by giving a predetermined chromatic dispersion to signal light in each channel on the transmitting side.

It is a further object of the present invention to provide an optical transmitting device which can suppress the waveform distortion of signal light by giving a predetermined frequency shift to signal light in each channel on the transmitting side.

In accordance with an aspect of the present invention, there is provided an optical transmitting device for use in a wavelength division multiplexing optical transmission system for transmitting a plurality of optical signals different in wavelength through a transmission line, comprising a plurality of electro-optical converting means for respectively converting electrical signals into said plurality of optical signals different in wavelength; a plurality of pre-compensation means for chromatic dispersion respectively connected to said plurality of electro-optical converting means, for respectively giving certain chromatic dispersions to said plurality of optical signals, each of said pre-compensation means for chromatic dispersion being adapted to compensate for a chromatic dispersion difference in said transmission line due to a wavelength difference between a wavelength of each optical signal and a specific wavelength at which a chromatic dispersion in said transmission line becomes zero; and an optical multiplexer connected to said plurality of pre-compensation means for chromatic dispersion, for multiplexing said plurality of optical signals to which said certain chromatic dispersions have been given.

Preferably, each of the plural pre-compensation means for chromatic dispersion is configured by an optical fiber. When the signal light has a wavelength shorter than the specific wavelength, an optical fiber having a positive chromatic dispersion is used, whereas when the signal light has a wavelength longer than the specific wavelength, an optical fiber having a negative chromatic dispersion is used.

In accordance with another aspect of the present invention, there is provided an optical transmitting device for use in a wavelength division multiplexing optical transmission system for transmitting a plurality of optical signals different in wavelength through a transmission line, comprising a plurality of electro-optical converting means for respectively converting electrical signals into said plurality of optical signals different in wavelength, each of said electro-optical converting means having modulating means for performing both intensity modulation and phase modulation to each of said optical signals; and an optical multiplexer connected to said plurality of electro-optical converting means, for multiplexing said plurality of optical signals.

The modulating means performs both intensity modulation and phase modulation to each optical signal, thereby giving a predetermined frequency shift, i.e., a pre-chirp, to each optical signal. Accordingly, the chromatic dispersion compensation in the wavelength division multiplexing optical amplification repeating transmission system can be improved. For example, each of the plural electro-optical converting means comprises a light source for emitting continuous light and an intensity modulator for modulating the continuous light output from the light source according to each electrical signal. The intensity modulator performs both intensity modulation and phase modulation to the continuous light, thereby giving a predetermined frequency shift to each optical signal.

Alternatively, each electro-optical converting means comprises a light source for emitting continuous light and a modulator for directly modulating the light source according to each electrical signal. This modulator performs both intensity modulation and phase modulation to the continuous light, thereby giving a predetermined frequency shift to each optical signal.

In accordance with a further aspect of the present invention, there is provided an wavelength division multiplexing optical transmission system comprising a plurality of electro-optical converting means for respectively converting electrical signals into a plurality of optical signals different in wavelength; a plurality of pre-compensation means for chromatic dispersion respectively connected to said plurality of electro-optical converting means, for respectively giving certain chromatic dispersions to said plurality of optical signals; an optical multiplexer connected to said plurality of pre-compensation means for chromatic dispersion, for multiplexing said plurality of optical signals to which said certain chromatic dispersions have been given; an optical transmission line connected at one end thereof to said optical multiplexer; an optical demultiplexer connected to the other end of said optical transmission line, for demultiplexing said plurality of optical signals wavelength division multiplexed; a plurality of post-compensation means for chromatic dispersion adapted to receive optical signals output from said optical demultiplexer, for respectively giving certain chromatic dispersions to said optical signals received; and a plurality of opto-electrical converting means for respectively converting optical signals output from said plurality of post-compensation means for chromatic dispersion into electrical signals.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a block diagram of a second preferred embodiment of the present invention;

FIGS. 7A and 7B are views showing examples of an intensity modulator;

DESCRIPTION OF THE PREFERRED EMBODIMENTS

Figure 1:
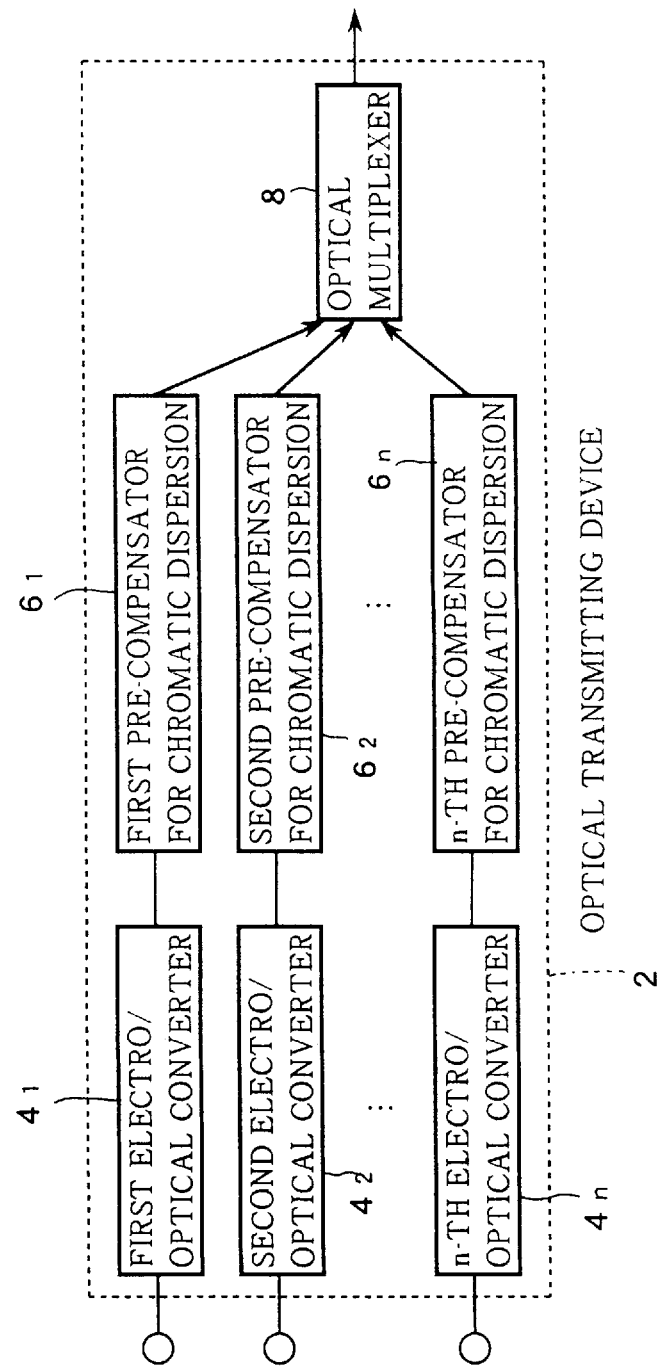
FIG. 1 is a block diagram of a first preferred embodiment of the present invention.

Referring to FIG. 1, there is shown a block diagram of a first preferred embodiment of the present invention. This preferred embodiment adopts a pre-compensation method such that a predetermined chromatic dispersion is given to each channel on the transmitting side. An optical transmitting device 2 includes a plurality of electro-optical converters $4_1$ to $4_n$ for converting electrical signals into a plurality of optical signals different in wavelength. There are provided on the back stage of the electro-optical converters $4_1$ to $4_n$ a plurality of pre-compensators for chromatic dispersion $6_1$ to $6_n$ for giving a predetermined chromatic dispersion to the optical signals output from the electro-optical converters $4_1$ to $4_n$, respectively. An optical multiplexer 8 is connected to the plural pre-compensators for chromatic dispersion $6_1$ to $6_n$ to multiplex optical signals output from the pre-compensators for chromatic dispersion $6_1$ to $6_n$ and transmit the multiplexed optical signals to a transmission line.

In the optical transmitting device 2 according to this preferred embodiment, each of the pre-compensators for chromatic dispersion $6_1$ to $6_n$ compensates for a chromatic dispersion difference in the optical transmission line due to a wavelength difference between the wavelength of each optical signal and a specific wavelength at which a chromatic dispersion in the optical transmission line becomes zero.

Figure 2:
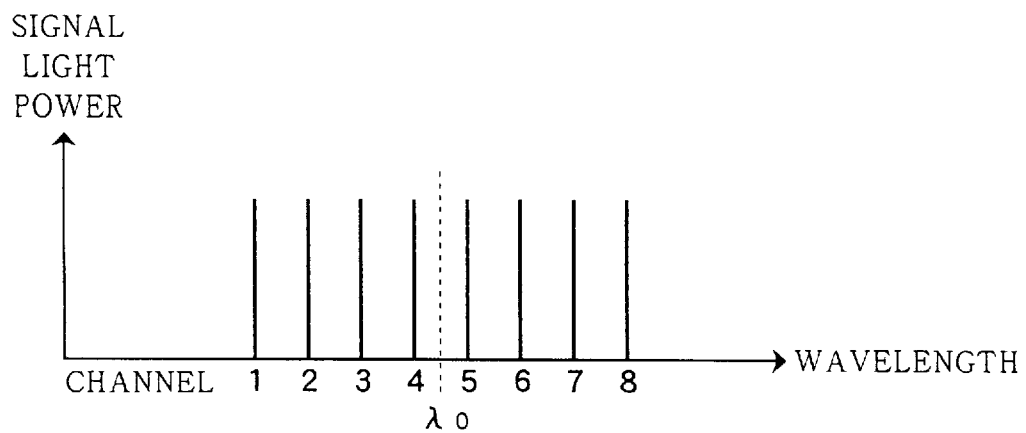
FIG. 2 is a graph showing an example of channel arrangement in the first preferred embodiment.

FIG. 2 shows an example of channel arrangement in the case of eight channels. As shown in FIG. 2, four channels are uniformly arranged on both sides of a specific wavelength $\lambda_0$. A chromatic dispersion compensating fiber having a positive chromatic dispersion is used as pre-compensation for each channel having a wavelength shorter than the specific wavelength. On the other hand, a chromatic dispersion compensating fiber having a negative chromatic dispersion is used as pre-compensation for each channel having a wavelength longer than the specific wavelength. For example, a 1.3 μm zero-dispersion fiber is used as the chromatic dispersion compensating fiber having a positive chromatic dispersion, and a 1.5 μm zero-dispersion fiber or a special compensating fiber is used as the chromatic dispersion compensating fiber having a negative chromatic dispersion.

Figure 3:
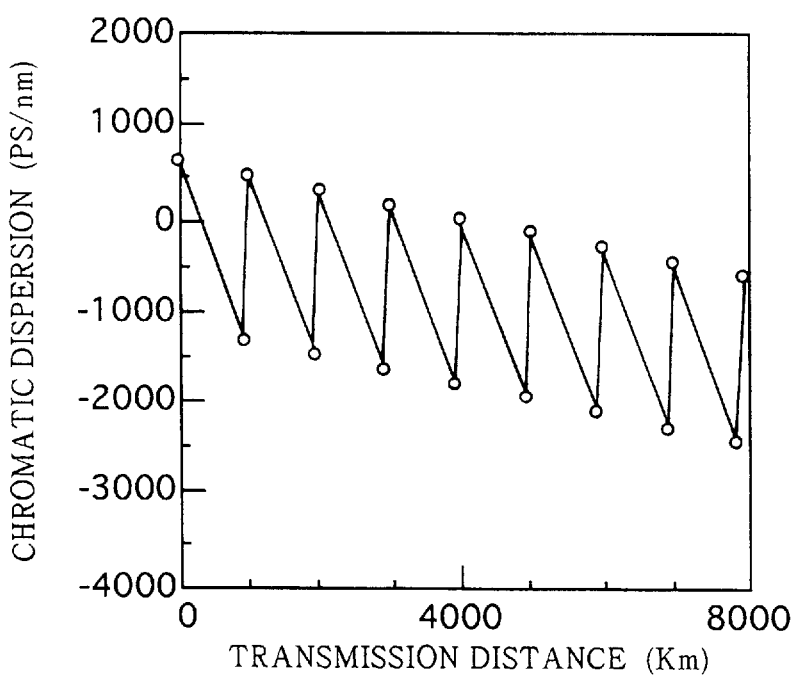
FIG. 3 is a graph showing a chromatic dispersion quantity of signal light having a wavelength of 1556 nm according to the first preferred embodiment.
Figure 4:
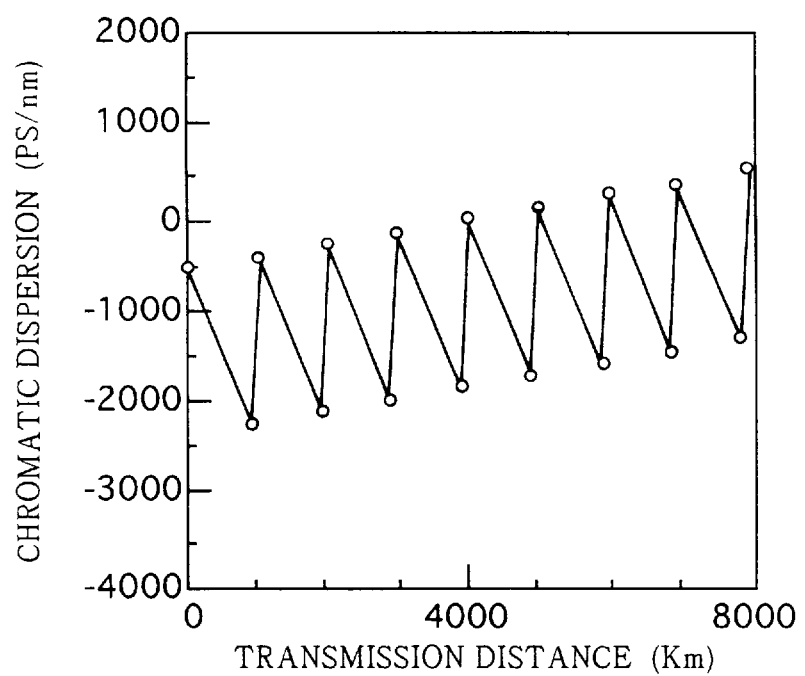
FIG. 4 a graph showing a chromatic dispersion quantity of signal light having a wavelength of 1559.7 nm according to the first preferred embodiment.
Figure 19:
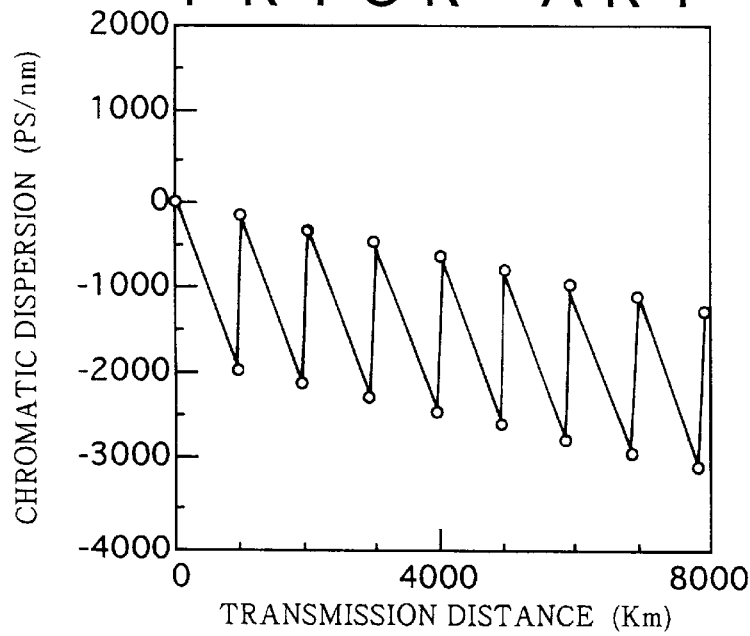
FIG. 19 is a graph showing a chromatic dispersion quantity of signal light having a wavelength of 1556 nm in the prior art.
Figure 20:
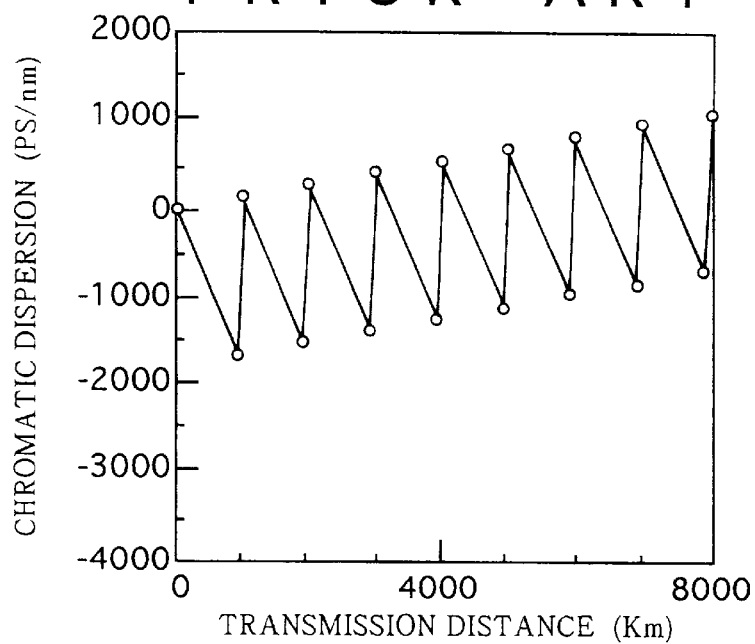
FIG. 20 is a graph showing a chromatic dispersion quantity of signal light having a wavelength of 1559.7 nm in the prior art.
Figure 21:
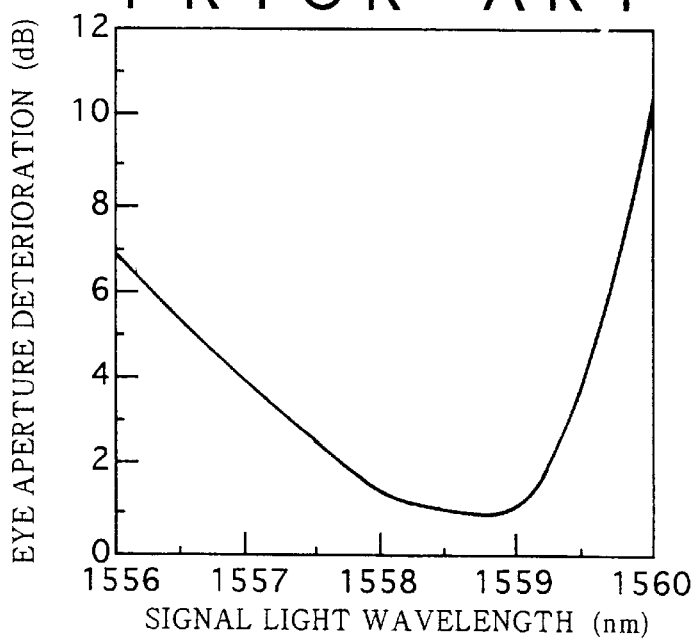
FIG. 21 is a graph showing the wavelength dependence of transmission characteristics in the case where only post-compensation for chromatic dispersion is carried out.

FIG. 3 shows a chromatic dispersion map in the case where signal light having a wavelength of 1556.0 nm is transmitted by the optical transmitting device 2 according to this preferred embodiment. When a chromatic dispersion of +640 ps/nm is given by the pre-compensator for chromatic dispersion 6, a compensated chromatic dispersion of −640 ps/nm remains after 8000 km transmission. As compared with the prior art shown in FIG. 19, the remaining compensated chromatic dispersion is reduced to the half. FIG. 4 shows a chromatic dispersion map in the case where signal light having a wavelength of 1559.7 nm is transmitted. When a chromatic dispersion of −550 ps/nm is given by the pre-compensator for chromatic dispersion 6, a compensated chromatic dispersion of +550 ps/nm remains after 8000 km transmission. As compared with the prior art shown in FIG. 20, the remaining compensated chromatic dispersion is similarly reduced to the half.

Referring to FIG. 5, there is shown a block diagram of a second preferred embodiment of the present invention. This preferred embodiment adopts a pre-chirp method such that a predetermined frequency shift is given to each channel. An optical transmitting device 2A includes a plurality of electro-optical converters $10_1$ to $10_n$ for converting electrical signals into a plurality of optical signals different in wavelength and an optical multiplexer 8 connected to the plural electro-optical converters $10_1$ to $10_n$, for multiplexing the optical signals output from the electro-optical converters $10_1$ to $10_1$. Each of the electro-optical converters $10_1$ to $10_n$ has modulating means 12 for performing both intensity modulation and phase modulation to each optical signal.

Figure 6A:
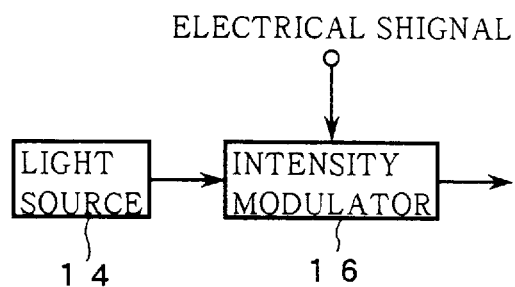
FIGS. 6A, 6B, and 6C are block diagrams showing examples of an electro-optical converter.
Figure 6B:
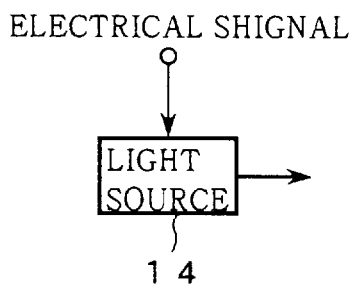
Figure 6C:
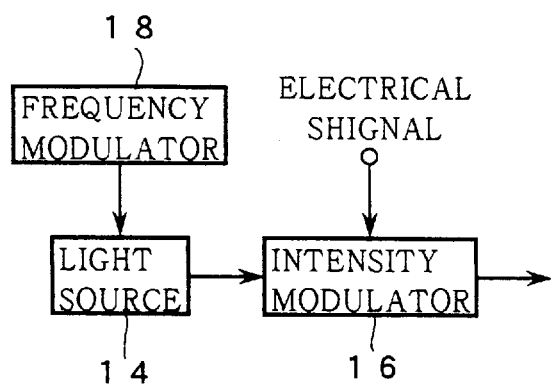

The modulating means 12 performs both intensity modulation and phase modulation to each optical signal, thereby giving a predetermined frequency shift to each optical signal. FIGS. 6A, 6B, and 6C show some examples of the electro-optical converter 10. The electro-optical converter 10 shown in FIG. 6A as an example is composed of a light source 14 for emitting continuous light and an intensity modulator 16 for modulating the continuous light output from the light source 14 according to an electrical signal. The intensity modulator 16 is adapted to perform both intensity modulation and phase modulation to the continuous light. The intensity modulator 16 is configured by a Mach-Zehnder optical modulator, for example. Thus, the intensity modulator 16 performs both intensity modulation and phase modulation to the continuous light, thereby giving a predetermined frequency shift to the optical signal.

The electro-optical converter 10 shown in FIG. 6B as another example includes a light source 14 for emitting continuous light. The light source 14 is directly modulated according to an electrical signal to convert the electrical signal into an optical signal. When the light source 14 is directly modulated according to the electrical signal, both intensity modulation and phase modulation are performed to thereby give a predetermined frequency shift to the optical signal.

The electro-optical converter 10 shown in FIG. 6C as still another example is composed of a light source 14 for emitting continuous light, a frequency modulator 18 for modulating the light source 14 at a frequency substantially corresponding to a transmission speed or bit rate, and an intensity modulator 16 for modulating the continuous light output from the light source 14 according to an electrical signal. In this example, the light source 14 is directly modulated by the frequency modulator 18 to thereby give a pre-chirp to the continuous light emitted from the light source 14. The intensity modulator 16 performs modulation of a main signal only.

Referring to FIGS. 7A and 7B, there are shown different Mach-Zehnder optical modulators 20A and 20B employable as the intensity modulator 16. The Mach-Zehnder optical modulator 20A shown in FIG. 7A has a waveguide 24 formed on a substrate 22 of lithium niobate ($LiNbO_3$) or the like and a pair of branched waveguides 26a and 26b connected to the waveguide 24. A pair of electrodes 28 and 30 different in shape are mounted on the branched waveguides 26a and 26b, respectively. The electrode 28 is a signal electrode, and the electrode 30 is a ground electrode. Thus, the Mach-Zehnder optical modulator 20A has the pair of electrodes 28 and 30 asymmetrical with each other. Therefore, both intensity modulation and phase modulation can be performed to the optical signal.

The Mach-Zehnder optical modulator 20B shown in FIG. 7B differs from the optical modulator 20A shown in FIG. 7A in only that the shape of an electrode 28' is different from that of the electrode 28. That is, the electrode 28' extends to the waveguide 24, thereby forming a phase modulating portion 32. Thus, the Mach-Zehnder optical modulator 20B shown in FIG. 7B has the phase modulating portion 32. Therefore, as compared with the optical modulator 20A shown in FIG. 7A, the optical modulator 20B can positively perform phase modulation to the optical signal, thereby generating a larger frequency shift (pre-chirp).

Figure 8:
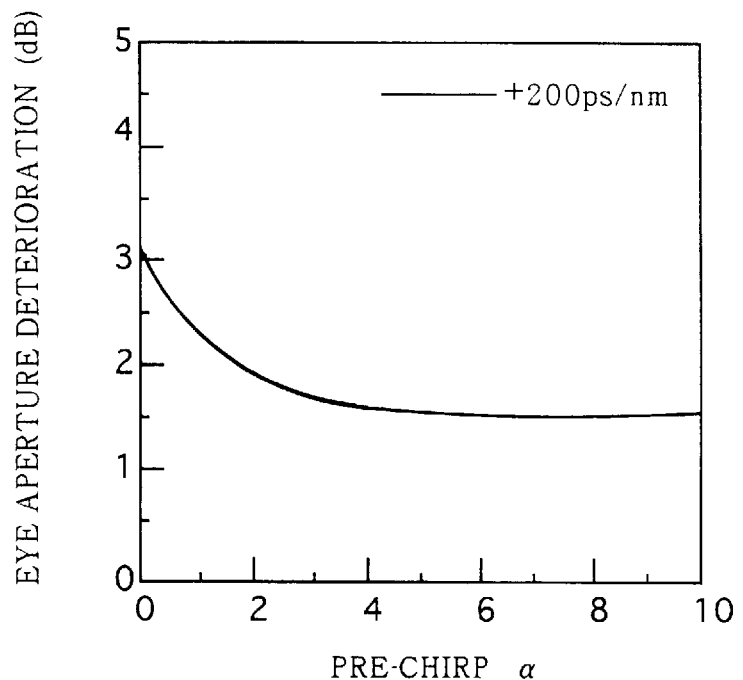
FIG. 8 is a graph showing the relation between a pre-chirp quantity and an eye aperture deterioration.

Referring to FIG. 8, there is shown the relation between a pre-chirp quantity of signal light and an eye aperture deterioration. The pre-chirp quantity dependence of transmission characteristics was herein evaluated in the case of a chromatic dispersion of +200 ps/nm. However, high-speed polarization scrambling was applied to the signal light. It is apparent that the transmission characteristics are improved in the range of the pre-chirp quantity $\alpha 0.5$ to 3.0 times the transmission speed. While FIG. 8 shows that the eye aperture deterioration is small even in the range of the pre-chirp quantity $\alpha$ not less than 3.0, this range is not preferable because the application of a pre-chirp quantity not less than 3.0 to the signal light causes distortion of a waveform due to spreading of the spectrum of the signal light.

Figure 9:
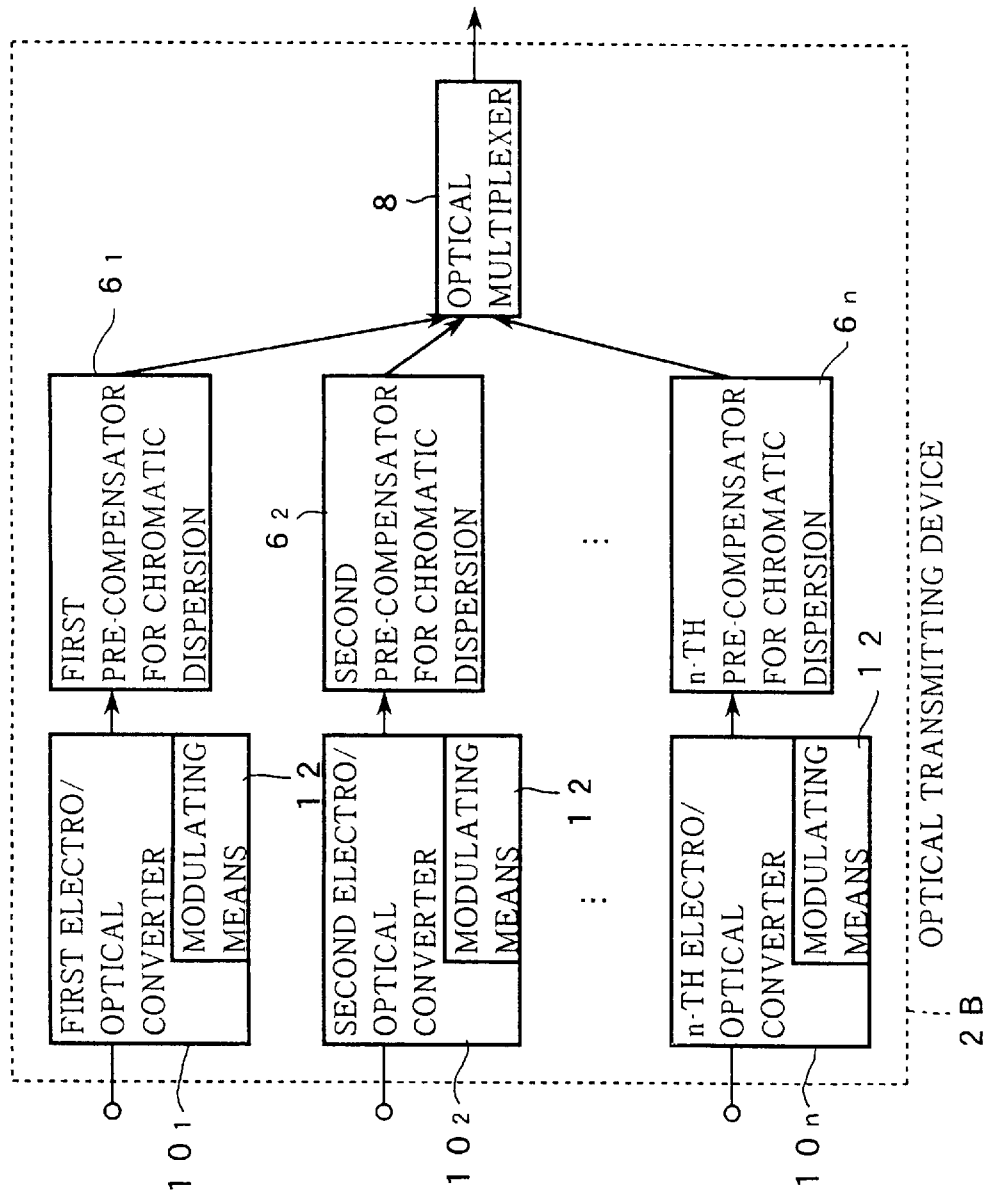
FIG. 9 is a block diagram of a third preferred embodiment of the present invention.

Referring to FIG. 9, there is shown a block diagram of a third preferred embodiment of the present invention. An optical transmitting device 2B in this preferred embodiment adopts the combination of the pre-compensation method shown in FIG. 1 and the pre-chirp method shown in FIG. 5, so that this device 2B is more effective.

Figure 10:
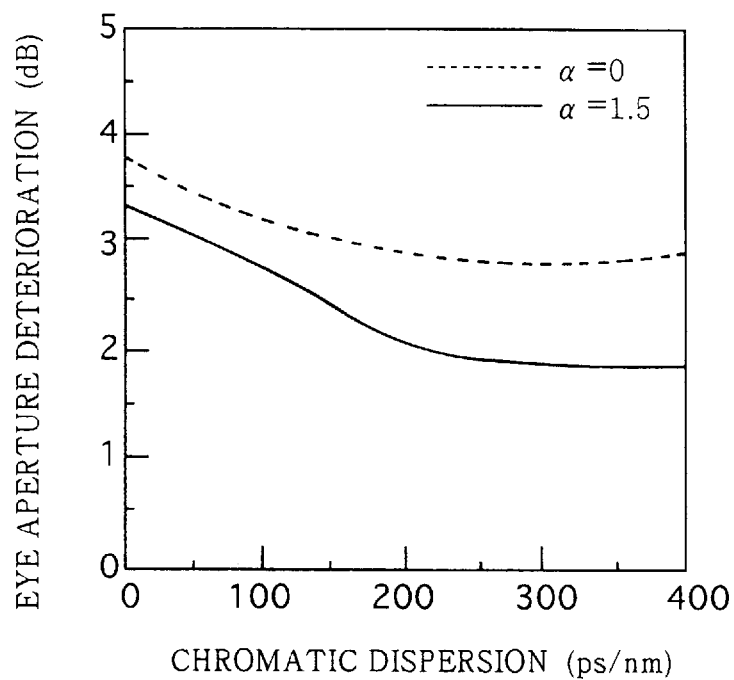
FIG. 10 is a graph showing the relation between a chromatic dispersion quantity and an eye aperture deterioration.

Referring to FIG. 10, there is shown the relation between a chromatic dispersion quantity and an eye aperture deterioration in the case of a signal light wavelength of 1557 nm. In FIG. 10, a broken line shows the case where only the pre-compensation was performed and the pre-chirp was not performed, whereas a solid line shows the case where both the pre-chirp in an amount of 1.5 and the pre-compensation were performed in combination. As apparent from FIG. 10, when a pre-compensation of +200 to +400 ps/nm is applied to a cumulative chromatic dispersion of about −400 ps/nm in the transmission line, the transmission characteristics can be improved. That is, the transmission characteristics can be greatly improved by giving a pre-compensation in an amount of 0.5 or more times a chromatic dispersion difference in the transmission line.

Figure 11:
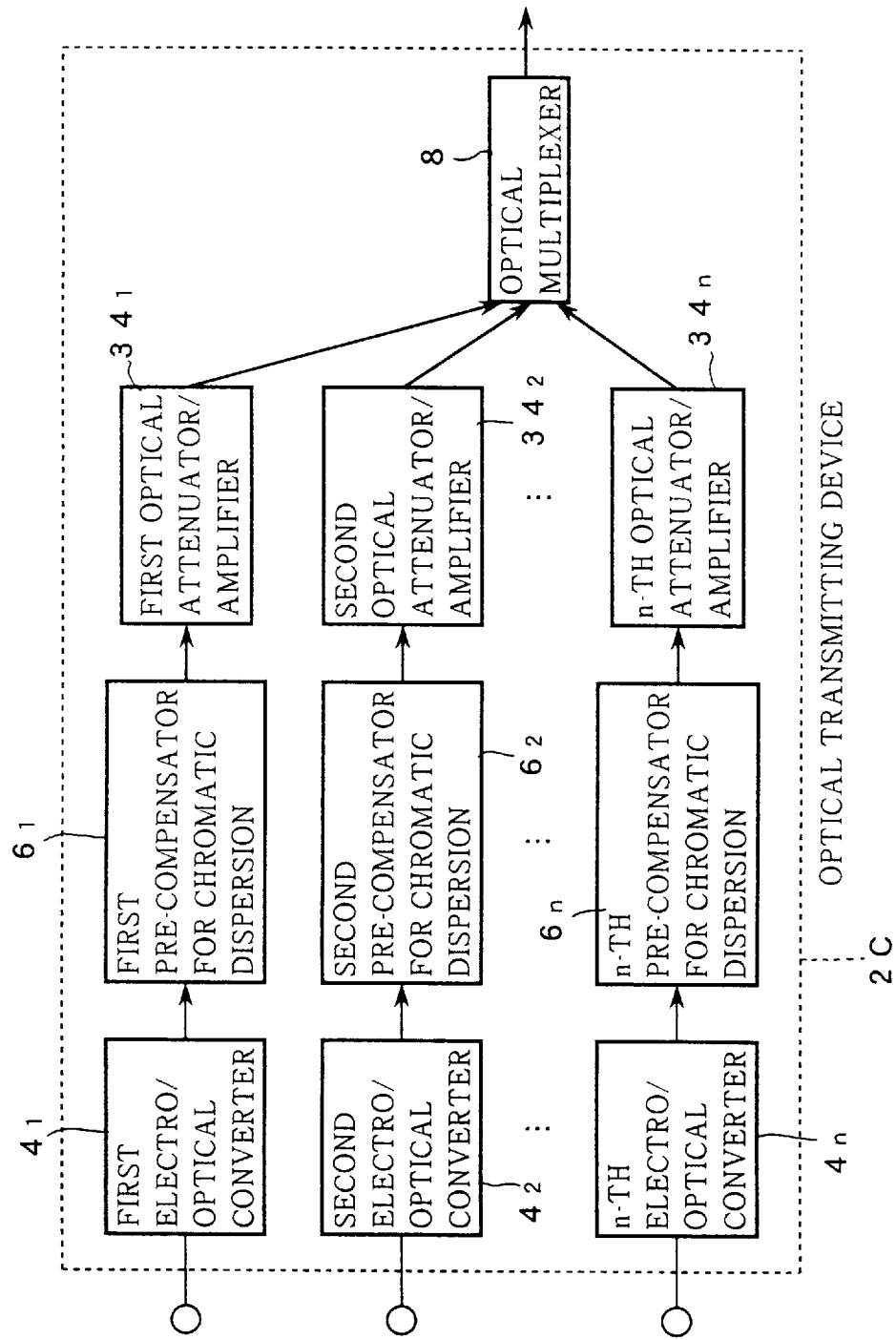
FIG. 11 is a block diagram of a fourth preferred embodiment of the resent invention.

Referring to FIG. 11, there is shown a block diagram of a fourth preferred embodiment of the present invention. This preferred embodiment employs an optical attenuator or an optical amplifier to perform pre-emphasis such that the signal light power in each channel is set to a different value. That is, a plurality of optical attenuators or optical amplifiers $34_1$ to $34_n$ are inserted between a plurality of pre-compensators for chromatic dispersion $6_1$ to $6_n$ and an optical multiplexer 8. In order to suppress a deterioration in ratio between signal light power and noise light power due to the wavelength dependence of gains of a plurality of optical amplifiers inserted in the transmission line, the signal light power in each channel is set to a different value by each of the optical attenuators or the optical amplifiers $34_1$ to $34_n$.

Figure 12:
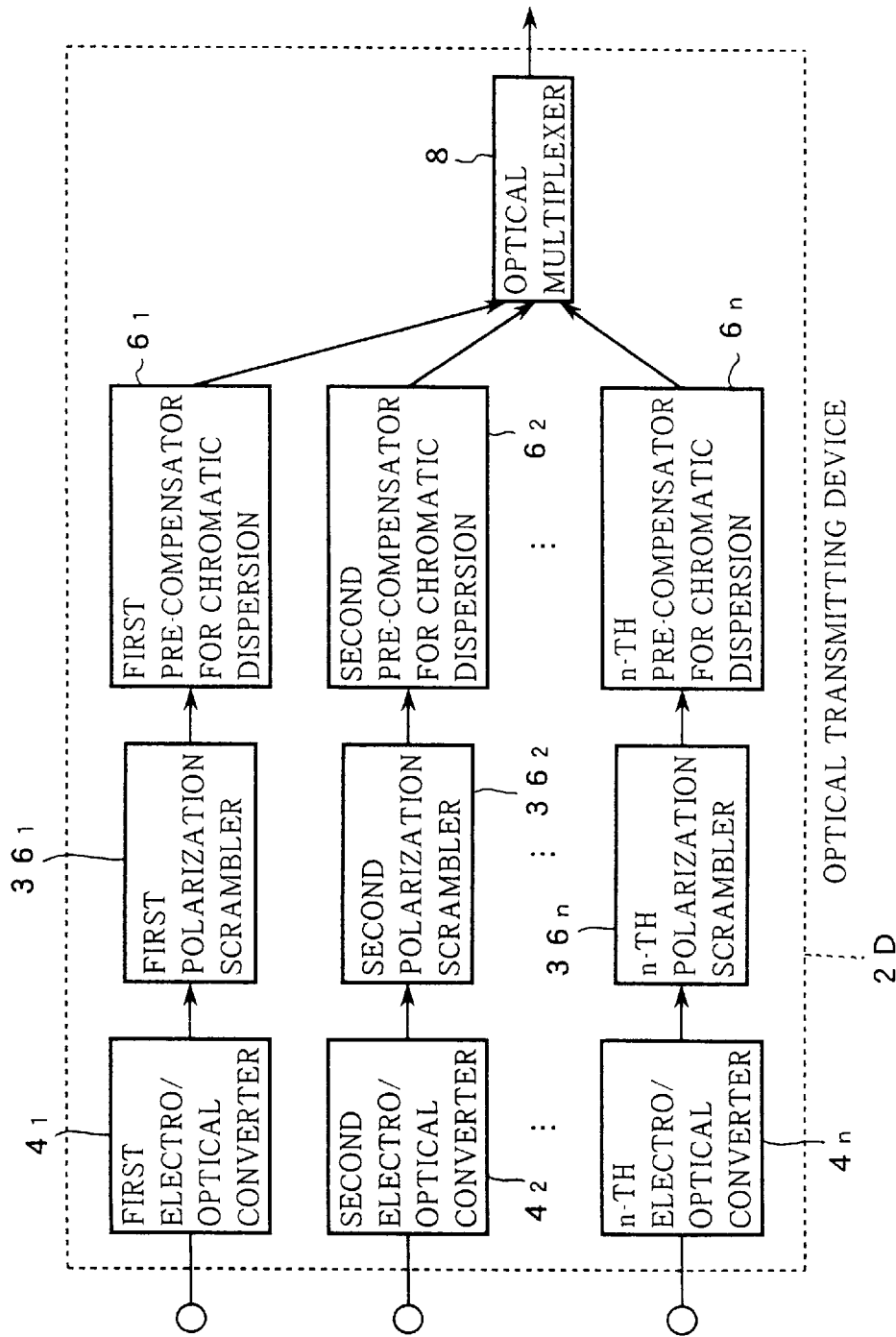
FIG. 12 is a block diagram of a fifth preferred embodiment of the present invention.

Referring to FIG. 12, there is shown a block diagram of a fifth preferred embodiment of the present invention. In this preferred embodiment, a polarization scrambler is inserted in each channel to realize an alteration in polarization condition of signal light. That is, an optical transmitting device 2D employs a plurality of polarization scramblers $36_1$ to $36_n$ inserted between a plurality of pre-compensators for chromatic dispersion $6_1$ to $6_n$ and an optical multiplexer 8. The polarization condition of each optical signal is altered by each of the polarization scramblers $36_1$ to $36_n$ to suppress a deterioration in signal light due to gain or loss of the polarization dependence of a plurality of optical amplifiers inserted in the transmission line.

Figure 13:
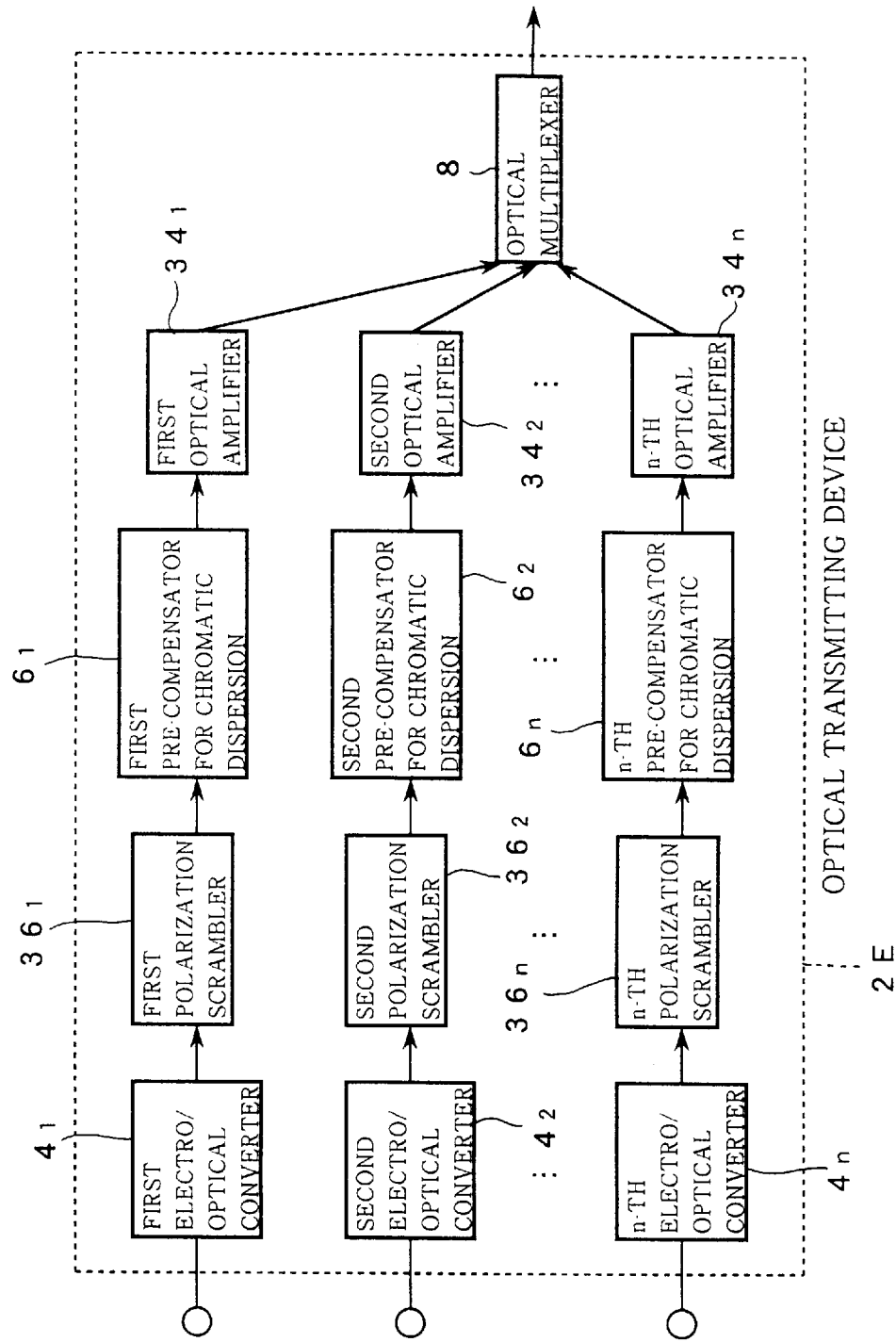
FIG. 13 is a block diagram of a sixth preferred embodiment of the present invention.

Referring to FIG. 13, there is shown a block diagram of a sixth preferred embodiment of the present invention. In this preferred embodiment, a plurality of polarization scramblers $36_1$ to $36_n$ and a plurality of optical amplifiers $34_1$ to $34_n$ are inserted in all channels, respectively. With this arrangement, both pre-emphasis of each signal light and alteration of the polarization condition of each signal light are performed. The optical amplifiers $34_1$ to $34_1$ may be located on the front stage of the polarization scramblers $36_1$ to $36_n$. Further, the optical amplifiers $34_1$ to $34_n$ may be replaced by optical attenuators.

Figure 14:
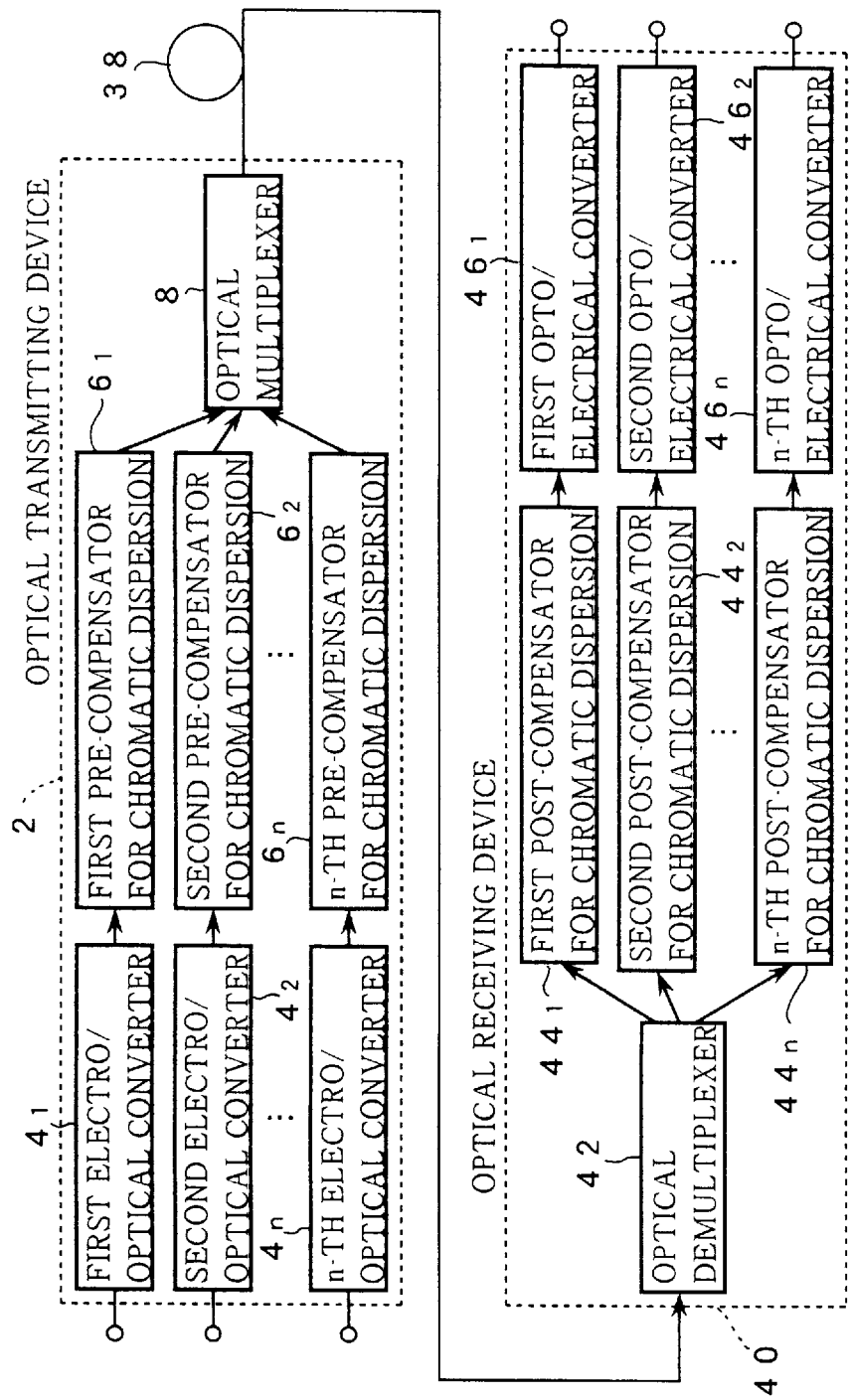
FIG. 14 is a block diagram of a seventh preferred embodiment of the present invention.

Referring to FIG. 14, there is shown a block diagram of a seventh preferred embodiment of the present invention. In this preferred embodiment, a wavelength division multiplexing optical transmission system is configured by using the optical transmitting device 2 shown in FIG. 1. As shown in FIG. 14, the optical transmitting device 2 and an optical receiving device 40 are connected together by a transmission line 38 of single-mode optical fibers. An optical demultiplexer 42 is provided in the optical receiving device 40 to demultiplex a wavelength division multiplexed optical signal transmitted through the transmission line 38 into a plurality of optical signals for all the channels.

The optical signals from the optical demultiplexer 42 are given certain chromatic dispersions by a plurality of post-compensators for chromatic dispersion $44_1$ to $44_n$. Thereafter, the optical signals are converted into electrical signals by a plurality of opto-electrical converters $46_1$ to $46_n$. According to this preferred embodiment, a chromatic dispersion difference in the transmission line 38 due to a wavelength difference between a wavelength of each optical signal and a specific wavelength at which a chromatic dispersion in the transmission line 38 becomes zero is compensated by the pre-compensators for chromatic dispersion $6_1$ to $6_n$ and the post-compensators for chromatic dispersion $44_1$ to $44_n$.

Figure 15:
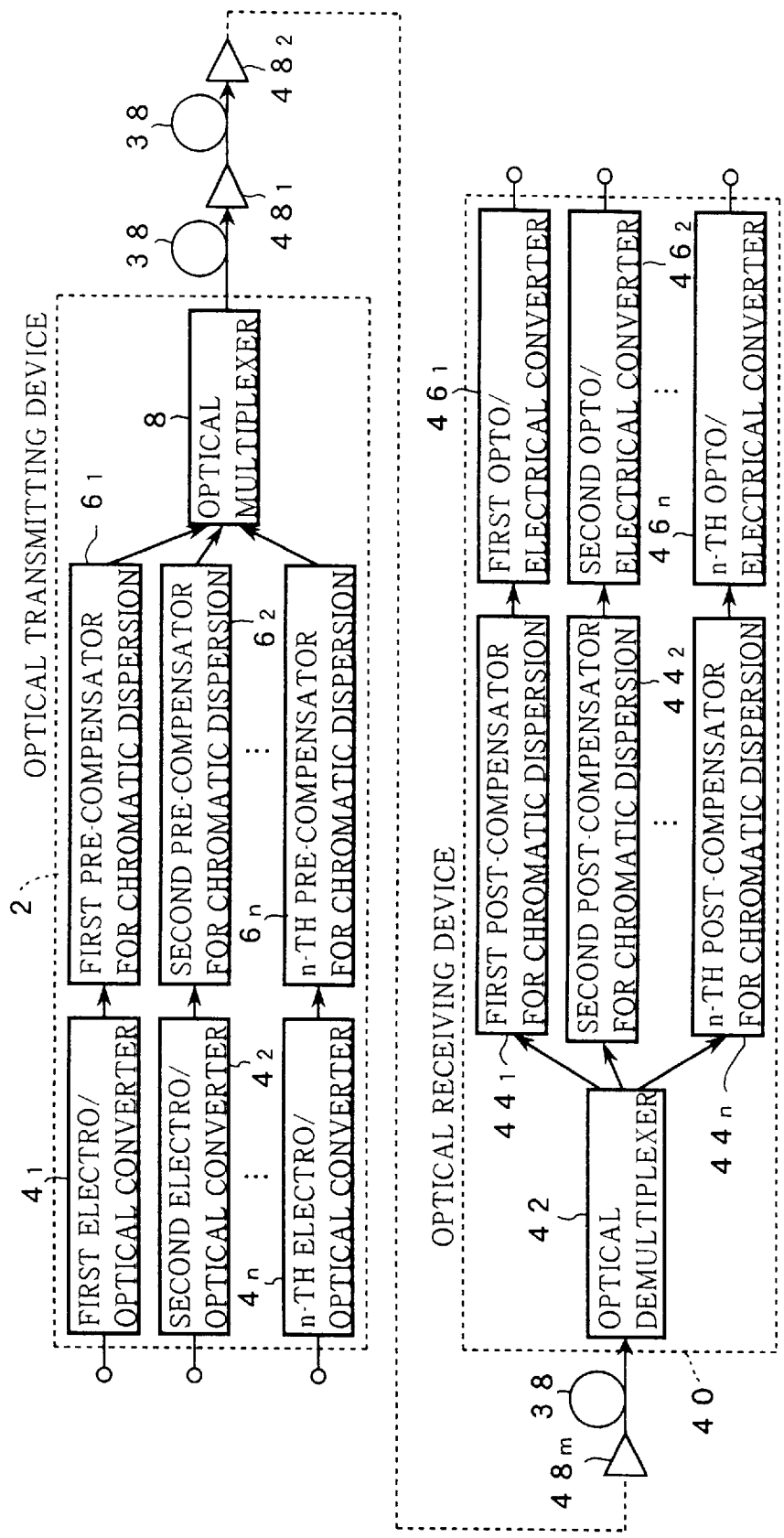
FIG. 15 is a block diagram of an eighth preferred embodiment of the present invention.

Referring to FIG. 15, there is shown a block diagram of an eighth preferred embodiment of the present invention. In this preferred embodiment, a plurality of optical amplifiers $48_1$ to $48_m$ are inserted in the transmission line 38 used in the seventh preferred embodiment shown in FIG. 14. When the optical transmitting device 2C shown in FIG. 11 is used in place of the optical transmitting device 2, pre-emphasis of each optical signal can be realized. In this case, in order to suppress a deterioration in ratio between signal light power and noise light power due to the wavelength dependence of gains of the optical amplifiers $48_1$ to $48_m$ inserted in the transmission line 38, the signal light power in each channel is set to a different value by the optical attenuators or the optical amplifiers $34_1$ to $34_n$.

Figure 16:
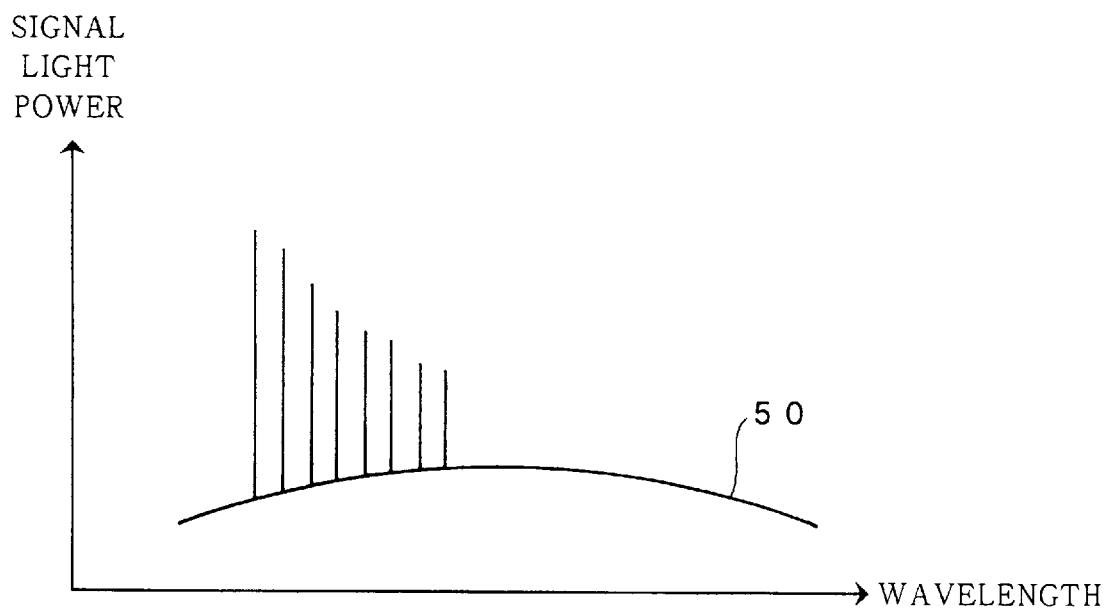
FIG. 16 is a graph showing an example of channel arrangement in the eighth preferred embodiment.

FIG. 16 shows an example of channel arrangement in the above case where pre-emphasis of each optical signal is performed. In FIG. 16, a curve 50 shows a gain-wavelength characteristic of the optical amplifiers $48_1$ to $48_m$. In the case of $\lambda j < \lambda k$ where $\lambda$ represents wavelength, the signal light wavelength is preferably set in a wavelength region where the gains $G(\lambda)$ of the optical amplifiers $48_1$ to $48_m$ satisfy $G(\lambda j) \leq G(\lambda k)$ as shown in FIG. 16.

Figure 17:
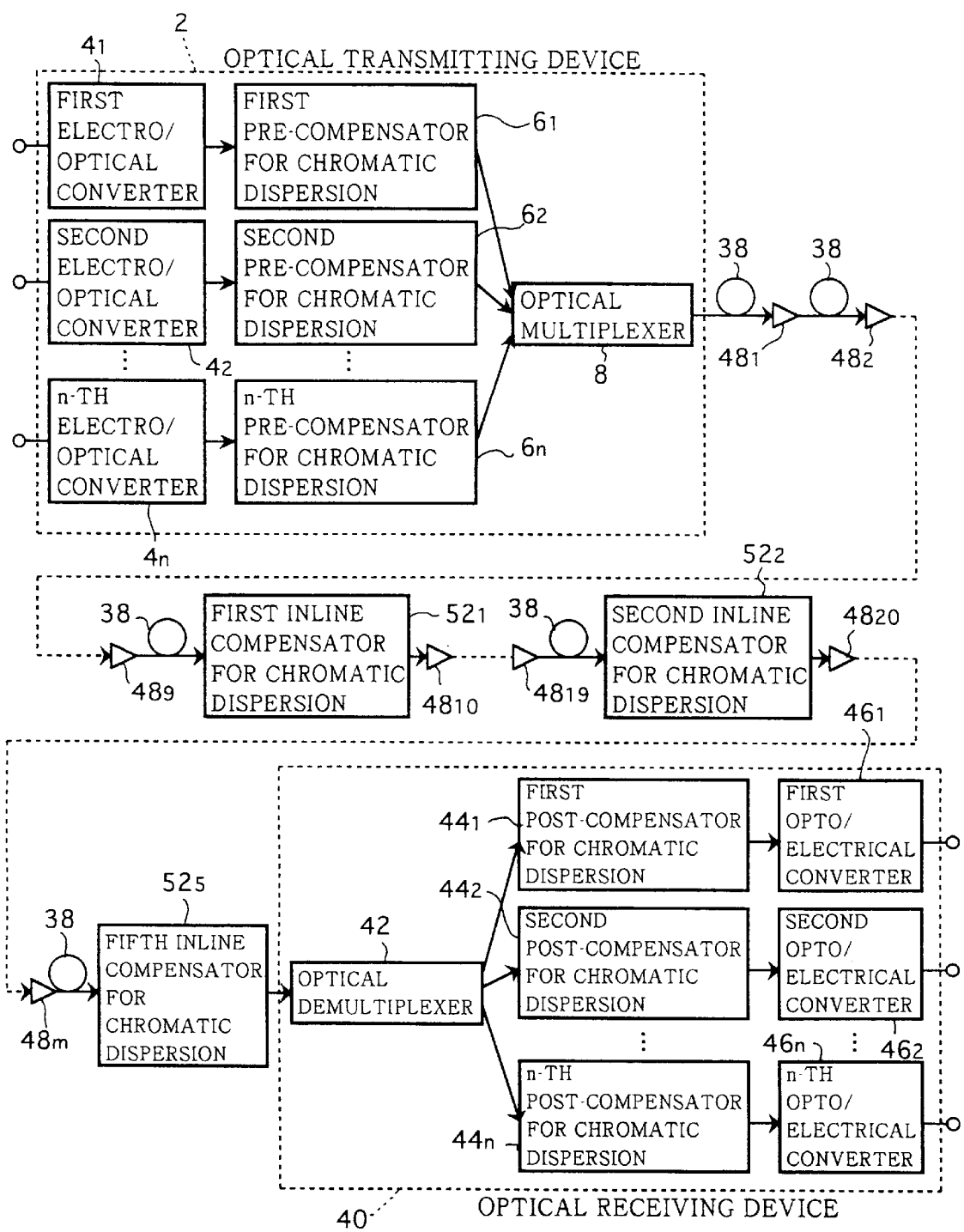
FIG. 17 is a block diagram of a ninth preferred embodiment of the resent invention.
Figure 18:
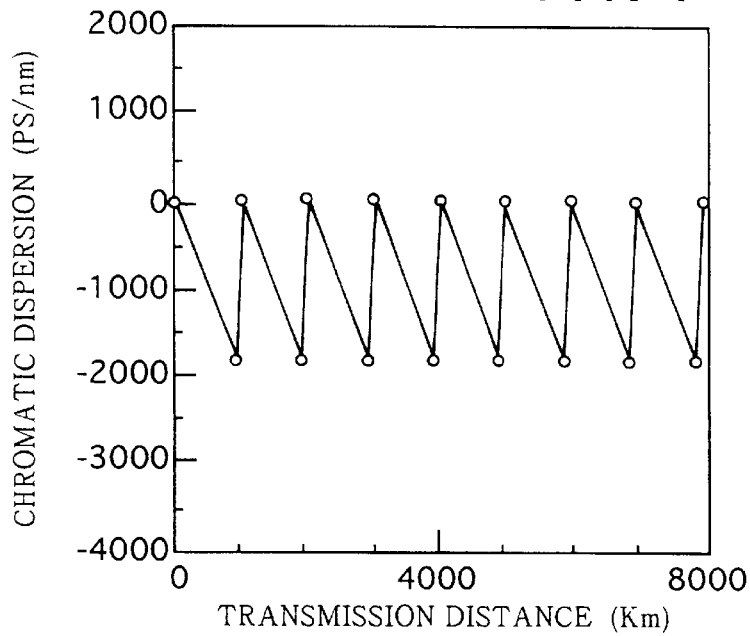
FIG. 18 is a graph showing a chromatic dispersion quantity of signal light having a wavelength of 1558 nm in the prior art.

Referring to FIG. 17, there is shown a block diagram of a ninth preferred embodiment of the present invention. In this preferred embodiment, a plurality of inline compensators for chromatic dispersion $52_1$ to $52_5$ are inserted in the transmission line 38 used in the eighth preferred embodiment shown in FIG. 15. The chromatic dispersions in the transmission line 38 are collectively compensated by the inline compensators for chromatic dispersion $52_1$ to $52_5$. However, a chromatic dispersion difference in each channel cannot be compensated by the inline compensators for chromatic dispersion $52_1$ to $52_5$.

According to the present invention, by performing chromatic dispersion compensation or pre-chirp for each optical signal on the transmitting side, the limitation of so-called post-compensation conventionally carried out to give an optimal chromatic dispersion quantity to each channel on the receiving side can be improved. By combining the pre-compensation to be carried out on the transmitting side and the post-compensation to be carried out on the receiving side, the waveform distortion of each optical signal can be suppressed to thereby greatly improve the transmission characteristics.

What is claimed is:

1. A wavelength division multiplexing optical transmission system comprising:

a plurality of electro-optical converting means for respectively converting electrical signals into a plurality of optical signals different in wavelength;

a plurality of pre-compensation means connected to said plurality of electro-optical converting means, for respectively providing chromatic dispersions to said plurality of optical signals;

an optical multiplexer connected to said plurality of pre-compensation means, for multiplexing said plurality of optical signals to which said chromatic dispersions have been provided;

an optical transmission line connected at one end thereof to said optical multiplexer;

an optical demultiplexer connected to another end of said optical transmission line, for demultiplexing said plurality of optical signals wavelengths division multiplexed;

a plurality of post-compensation means adapted to receive optical signals output from said optical demultiplexer, for respectively providing chromatic dispersions to said optical signals received;

a plurality of opto-electrical converting means for respectively converting optical signals output from said plurality of post-compensation means into electrical signals;

a plurality of first optical amplifiers inserted in said optical transmission line; and a plurality of inline chromatic dispersion compensating means inserted in said optical transmission line, each for providing chromatic dispersions to said plurality of optical signals;

wherein each of said pre-compensation means is configured by an optical fiber, said optical fiber being an optical fiber having a positive chromatic dispersion when said wavelength of each optical signal is shorter than said specific wavelength, whereas said optical fiber being an optical fiber having a negative chromatic dispersion when said wavelength of each optical signal is longer than said specific wavelength; and wherein each of said optical fibers has a chromatic dispersion quantity about 0.5 or more times the chromatic dispersion difference in said transmission line due to the wavelength difference between said wavelength of each optical signal and said specific wavelength.

2. A wavelength division multiplexing optical transmission system according to claim 1, wherein said optical fiber having a positive chromatic dispersion is a 1.3 $\mu$m zero-dispersion fiber, and said optical fiber having a negative chromatic dispersion is a 1.5 $\mu$m dispersion compensating fiber.

3. A wavelength division multiplexing optical transmission system according to claim 1, wherein each of said electro-optical converting means has modulating means for performing both intensity modulation and phase modulation to each of said optical signals.

4. A wavelength division multiplexing optical transmission system according to claim 1, further comprising a plurality of optical amplifiers each inserted between each of said plurality of pre-compensation means for chromatic dispersion and said optical multiplexer.

5. A wavelength division multiplexing optical transmission system according to claim 1, further comprising a plurality of optical attenuators each inserted between each of said plurality of pre-compensation means for chromatic dispersion and said optical multiplexer.

6. A wavelength division multiplexing optical transmission system according to claim 1, further comprising a plurality of polarization scramblers each inserted between each of said plurality of electro-optical converting means and each of said plurality of pre-compensation means for chromatic dispersion.

7. A wavelength division multiplexing optical transmission system according to claim 6, further comprising a plurality of optical amplifiers each inserted between each of said plurality of polarization scramblers and said optical multiplexer.

8. A wavelength division multiplexing optical transmission system according to claim 1, wherein said plurality of first optical amplifiers comprises a rare earth doped fiber.

9. A wavelength division multiplexing optical transmission system according to claim 1, further comprising a plurality of second optical amplifiers each inserted between each of said plurality of pre-compensation means for chromatic dispersion and said optical multiplexer;
wherein power of each optical signal is set to a different value by each of said second optical amplifiers, so as to suppress a deterioration in ratio between signal light power and noise light power due to wavelength dependence of gains of said first and second optical amplifiers.

10. A wavelength division multiplexing optical transmission system according to claim 9, wherein a wavelength λ of each optical signal is set in a wavelength region wherein said gains G(λ) of said first and second optical amplifiers satisfy G(λj)≦G(λk) when λj<λk.

11. A wavelength division multiplexing optical transmission system comprising:
a plurality of electro-optical converting means for respectively converting electrical signals into a plurality of optical signals different in wavelength;
a plurality of pre-compensation means respectively connected to said plurality of electro-optical converting means, for respectively providing chromatic dispersions to said plurality of optical signals;
an optical multiplexer connected to said plurality of pre-compensation means, for multiplexing said plurality of optical signals to which said chromatic dispersions have been provided;
an optical transmission line connected at one end thereof to said optical multiplexer;
an optical demultiplexer connected to another end of said optical transmission line, for demultiplexing said plurality of optical signals wavelengths division multiplexed;
a plurality of post-compensation means adapted to receive optical signals output from said optical demultiplexer, for respectively providing chromatic dispersions to said optical signals received;
a plurality of opto-electrical converting means for respectively converting optical signals output from said plurality of post-compensation means into electrical signals;
a plurality of first optical amplifiers inserted in said optical transmission line; and
a plurality of inline chromatic dispersion compensating means inserted in said optical transmission line, each providing chromatic dispersions to said plurality of optical signals;
wherein each of said electro-optical converting means has modulating means for performing both intensity modulation and phase modulation to each of said optical signals;
wherein a frequency shift quantity in said phase modulation is set to about 0.5 to about 3.0 times a bit rate;
wherein said modulating means performs said phase modulation so as to generate a positive frequency shift when said wavelength of each optical signal is shorter than said specific wavelength at which the chromatic dispersion in said transmission line becomes zero; and
wherein said modulating means performs said phase modulation so as to generate a negative frequency shift when said wavelength of each optical signal is longer than said specific wavelength at which the chromatic dispersion in said transmission line becomes zero.

12. A wavelength division multiplexing optical transmission system according to claim 11, wherein:
each of said electro-optical converting means comprises a light source for emitting continuous light and an intensity modulator for intensity-modulating said continuous light output from said light source according to each electrical signal;
said intensity modulator including said modulating means for performing both intensity modulation and phase modulation.

13. A wavelength division multiplexing optical transmission system according to claim 12, wherein said intensity modulator comprises a Mach-Zehnder optical modulator having a pair of asymmetrical electrodes.

14. A wavelength division multiplexing optical transmission system according to claim 12, wherein said intensity modulator comprises a Mach-Zehnder optical modulator having a pair of asymmetrical electrodes and a phase modulating portion.

15. A wavelength division multiplexing optical transmission system according to claim 11, wherein:
each of said electro-optical converting means comprises a light source for emitting continuous light and a modulator for directly modulating said light source according to each electrical signal;
said modulator including said modulating means for performing both intensity modulation and phase modulation.

16. A wavelength division multiplexing optical transmission system comprising:
a plurality of electro-optical converting means for respectively converting electrical signals into a plurality of optical signals different in wavelength;
a plurality of pre-compensation means respectively connected to said plurality of electro-optical converting means, for respectively providing chromatic dispersions to said plurality of optical signals;
an optical multiplexer connected to said plurality of pre-compensation means for multiplexing said plurality of optical signals to which said chromatic dispersions have been provided;
an optical transmission line connected at one end thereof to said optical multiplexer;
an optical demultiplexer connected to another end of said optical transmission line, for demultiplexing said plurality of optical signals wavelengths division multiplexed;
a plurality of post-compensation means adapted to receive optical signals output from said optical demultiplexer, for respectively providing chromatic dispersions to said optical signals received;
a plurality of opto-electrical converting means for respectively converting optical signals output from said plurality of post-compensation means into electrical signals;
a plurality of first optical amplifiers inserted in said optical transmission line; and
a plurality of inline chromatic dispersion compensating means inserted in said optical transmission line, each providing chromatic dispersions to said plurality of optical signals;
wherein each of said electro-optical converting means has a light source for emitting continuous light, a frequency modulator for modulating said light source at a frequency substantially corresponding to a bit rate, and an intensity modulator for intensity-modulating said continuous light output from said light source according to each electrical signal;

wherein a frequency shift quantity in said phase modulation is set to about 0.5 to about 3.0 times a bit rate;

wherein said modulating means performs said phase modulation so as to generate a positive frequency shift when said wavelength of each optical signal is shorter than said specific wavelength at which the chromatic dispersion in said transmission line becomes zero; and wherein said modulating means performs said phase modulation so as to generate a negative frequency shift when said wavelength of each optical signal is longer than said specific wavelength at which the chromatic dispersion in said transmission line becomes zero.

* * * * *